Feb. 24, 1953 R. F. DEHN 2,629,500
CRANE CAB
Filed April 24, 1947 4 Sheets-Sheet 2

INVENTOR.
ROY F. DEHN
BY
Kwis, Hudson, Boughton & Williams
ATTORNEYS

Feb. 24, 1953     R. F. DEHN     2,629,500
CRANE CAB
Filed April 24, 1947     4 Sheets-Sheet 3
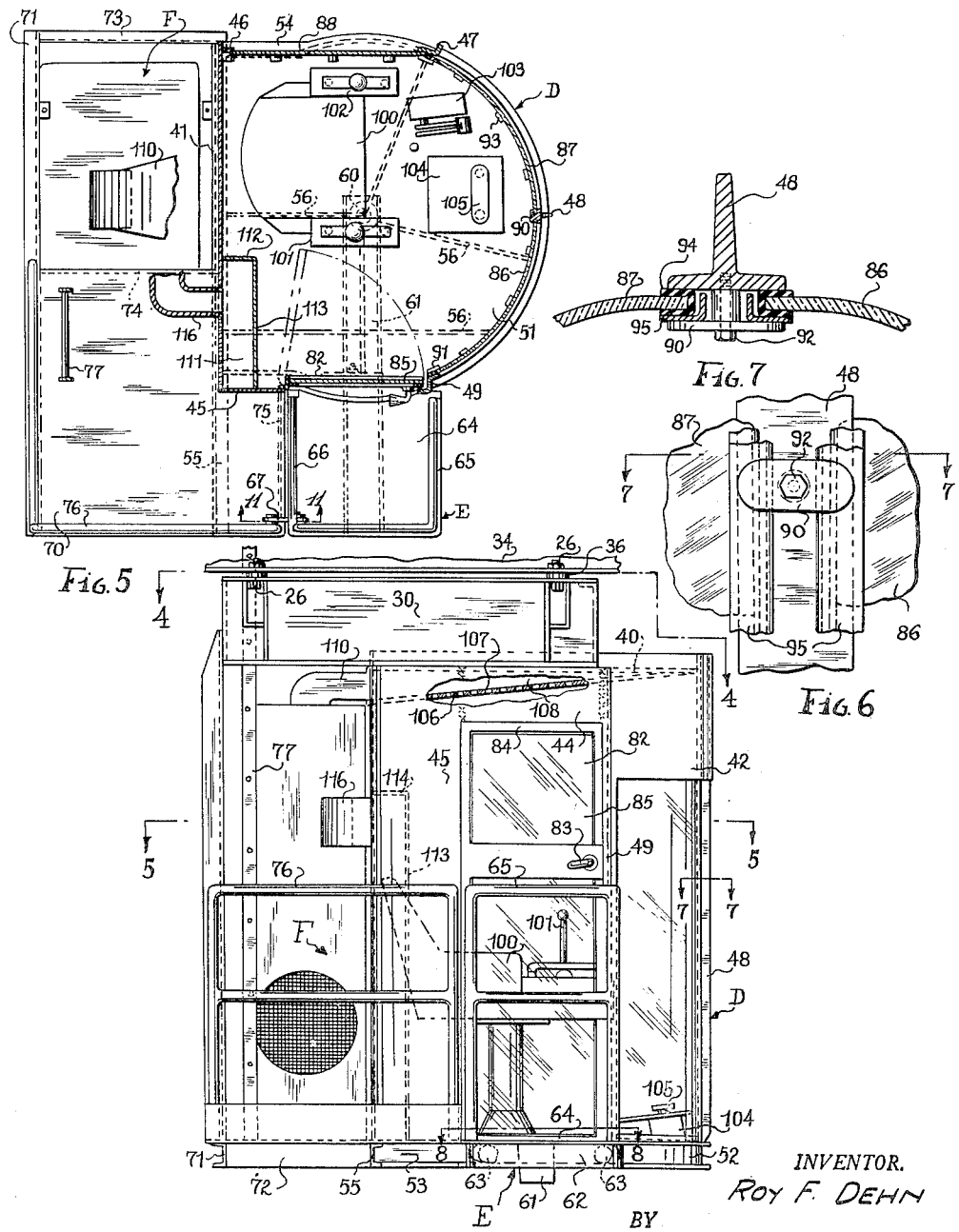
INVENTOR.
ROY F. DEHN
BY
Kwis, Hudson, Boughton & Williams
ATTORNEYS Feb. 24, 1953   R. F. DEHN   2,629,500
CRANE CAB
Filed April 24, 1947   4 Sheets-Sheet 4

INVENTOR.
ROY F. DEHN
BY
Kwis, Hudson, Boughton & Williams
ATTORNEYS

Patented Feb. 24, 1953

2,629,500

UNITED STATES PATENT OFFICE 2,629,500

CRANE CAB

Roy F. Dehn, Cleveland, Ohio, assignor to The Cleveland Crane & Engineering Company, Wickliffe, Ohio, a corporation of Ohio Application April 24, 1947, Serial No. 743,545

5 Claims. (Cl. 212—18)

The present invention relates to overhead, operators' enclosures or cabs and, more particularly, to operators' cabs for overhead traveling cranes. In certain respects, the present invention may be considered an improvement of the cab disclosed in a copending application of William G. Wehr, Serial No. 562,234, filed November 6, 1944, entitled "Crane Cab," now Patent No. 2,471,295, issued May 24, 1949.

Because crane operators usually work at high elevations and in all types of factories, etc., they are exposed to extremes of heat and cold and to various sorts of gases, smoke, fumes, and the like, some of which may be very injurious to their health. The principal object of the present invention is to alleviate this condition by the provision of a novel and improved, generally cylindrical, operator's cab or enclosure, small enough to be readily cooled or otherwise air conditioned and having its side walls composed largely of transparent material, in combination with air conditioning means which will maintain the atmosphere within the cab clean and comfortable without subjecting the operator to detrimental drafts.

Another object of the invention is the provision of a novel and improved operator's cab or enclosure of the character referred to, the transparent side walls of which are formed of a plurality of interchangeable, transparent panel members secured to the frame of the cab in such a manner that they can be readily replaced in the event they become damaged.

Another object of the invention is the provision of a novel and improved, generally cylindrical, operator's cab or enclosure of the character referred to having transparent side walls, a platform rotatable about the exterior of the cab for facilitating cleaning of the outside of the transparent side walls, a door providing access to and from said platform, in combination with means for preventing an operator from opening the door unless the platform is in front of the door, and means for preventing the platform from being moved out of its normal position in front of the door unless the door is closed.

The invention resides in certain constructions and combinations and arrangements of parts and further objects and advantages will be apparent to those skilled in the art to which it relates from the following description of the preferred embodiment described with reference to the accompanying drawings forming a part of this specification in which similar reference characters designate corresponding parts, and in which:

Fig. 3 is a fragmentary side elevational view, approximately on the line 3—3 of Fig. 1;

Fig. 5 is a sectional view, approximately on the line 5—5, of Fig. 3;

Fig. 6 is an enlarged elevational view showing the manner of securing the transparent panels to the frame proper;

Fig. 7 is a fragmentary sectional view, approximately on the line 7—7, of Figs. 3 and 6;

Figure 1:
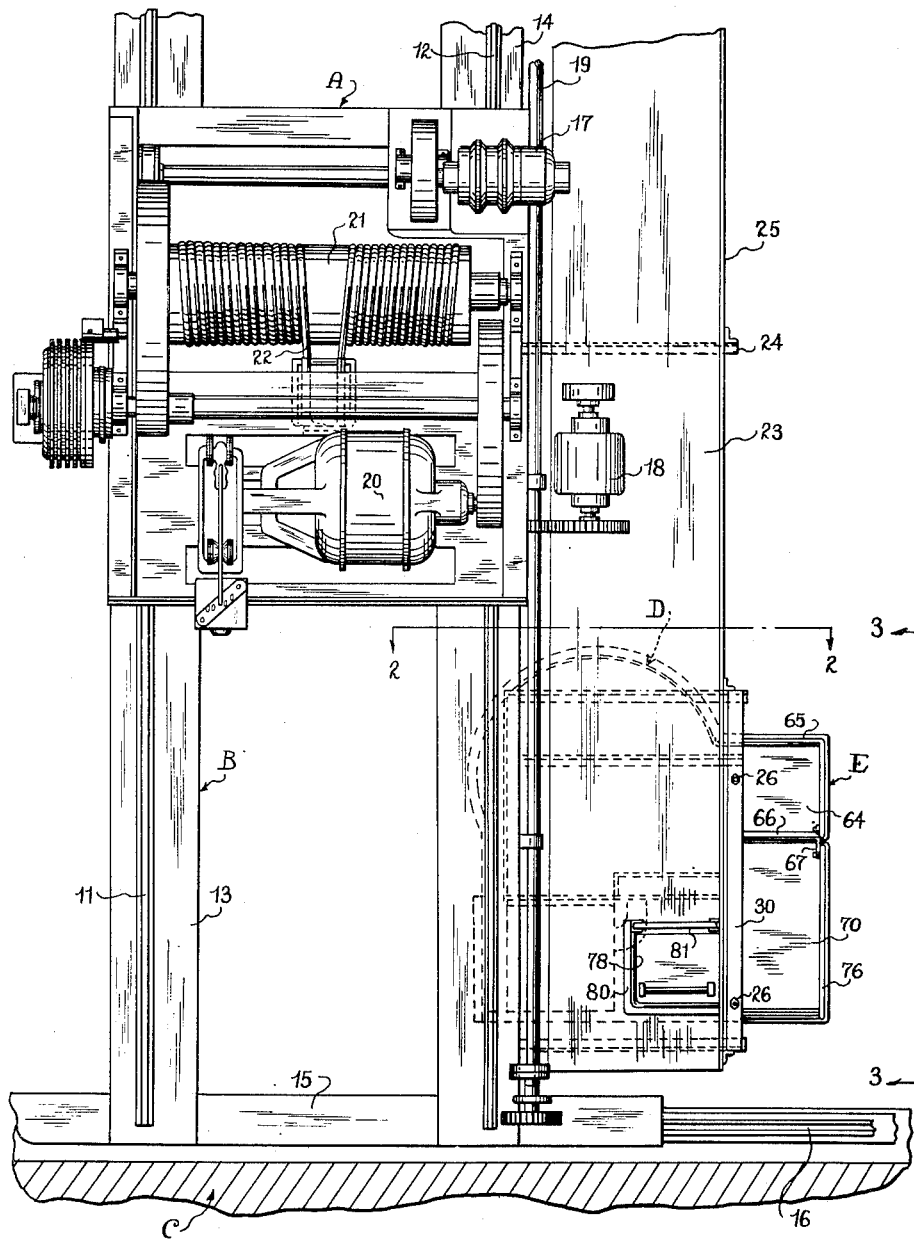
Fig. 1 is a fragmentary plan view of an overhead traveling crane embodying the present invention.

The operator's cab or enclosure of the present invention is particularly adapted for use with overhead traveling cranes and the preferred embodiment is herein shown as a part of an overhead traveling crane although it is to be understood that the cab may be otherwise employed. Only one end of the crane is shown in the drawings and only those parts of the crane which are necessary to an understanding of the present invention are herein referred to. The crane proper is of commercial construction and comprises a crane trolley A movable in opposite directions along rails 11, 12 upon spaced girders 13, 14 of a crane bridge B. The crane bridge includes bridge trolleys 15 at opposite ends, only one of which is shown, which support the bridge proper for movement along the crane runways, including a rail 16 at each end connected to the building or structure C within which the crane is housed. The crane trolley is adapted to be moved along the bridge B by a reversible electric motor 17 on the trolley and connected to one or more of the trolley wheels. The bridge B is moved in opposite directions along the crane runway at right angles to the movement of the crane trolley on the bridge B by a bridge motor 18 connected to one or more of the bridge trolley wheels by means including a shaft 19 extending the length of the bridge. The bridge motor 18 is provided with a hydraulic brake on an extension of its armature shaft. The crane trolley includes hoisting mechanism comprising a reversible hoist motor 20 connected to a cabledrum 21 provided with a load cable 22 which, in turn, carries the crane hook or other load grab.

The load cable extends downwardly between the bridge girders, as is the usual case, and the control cab, designated generally by the reference character D, is suspended from the bridge adjacent to one end thereof and offset with respect to the centerline of the bridge so that the load cable can pass thereby when the trolley is moved to the end of the bridge adjacent to the control cab. In the present instance, the bridge B includes a walkway along the right-hand side, as viewed in Fig. 1, for facilitating inspection and maintenance of the equipment, etc. The walkway comprises a floor plate 23 supported upon a plurality of projecting members 24 welded to the outside of the right-hand girder 14 and a hand rail 25 along the outside of the floor, and the control cab D is suspended from the walkway by bolts 26.

The control cab D is formed of welded-up, structural shapes and steel plates and the bolts 26 employed for connecting the cab to the walkway project through aligned apertures in the reinforced flanges of channel members 30 to 33 forming a box-like member at the top of the cab and angle irons 34, 35 extending between adjacent members 24 of the walkway. Preferably, rubber bushings 36 are interposed between the top of the box member referred to and the underside of the angle irons 34, 35. The box member spaces the top of the cab proper below the walkway a sufficient distance so that the part of the cab adjacent the girder 14 may project underneath the girder a limited extent.

The cab D is generally cylindrical; however, the particular cab shown has a flat or straight wall along its rear side, that is, the side toward the adjacent crane runway and comprises a D-shaped top plate 40 welded to the underside of the front half of the box-like frame formed by the channel members 30 to 33 and projecting forwardly and to the bridge side thereof, as clearly shown in the drawings. The rear, straight edge of the top plate 40 is welded to a vertical plate 41 which forms the rear or back wall of the cab proper and to a semi-tubular, vertical plate 42 which conforms in shape to the curved part of the plate 40. The upper edge of the plate 42 extends slightly above the top plate and the lower edge extends some distance below the top plate. One end of the plate 42 is welded to a plate 43 of approximately the same width as the plate 42, which plate 43 is, in turn, welded to one side of the top plate 40 and the rear or back plate 41. The opposite end of the plate 42 is welded to a relatively small plate 44 of less width than the plate 42 and which is located above and forms a part of the doorway, hereinafter described. The rear end of the plate 44 is welded to a vertical plate 45 extending the entire height of the cab.

The plate 45, together with the rear plate 41, and a plurality of vertical members 46, 47, 48, 49 form the support or suspension for the floor structure comprising a floor plate 51 reinforced by a circular channel member 52 welded to the periphery of the floor plate 51 adjacent to the edge. Opposite ends of the channel member 52 are welded to short sections of channel 53, 54, the rear ends of which are welded to a transversely extending, channel member 55 projecting beyond the cab proper on the side opposite the bridge for a purpose hereinafter apparent. In addition to the reinforcing members referred to, the floor structure may comprise a plurality of members 56 underneath the floor plate welded thereto and to one of the peripheral channel members 52 to 55. The inner ends of some of the reinforcing member 56 are welded to a boss 60, which boss is, in turn, welded to the underside of the floor plate 51 and forms a pivot for the radially extending member 61 of a movable platform, designated generally by the reference character E, which is similar to the platform shown in the aforesaid Wehr patent and comprises a box-like frame 62 supported for rotation about the cab proper by the pivoted member 61 and a plurality of rollers 63 connected to the member 62 and engaging within the channel portion of the member 52. The movable platform E comprises a floor plate 64 welded to the top of the box frame 62 and provided with a guard rail 65 around the three outer sides thereof, one portion 66 of which is hinged so that it may be opened when an operator desires to enter or leave the platform E and, in turn, the cab proper. The platform E is rotatable about the cab proper so that the transparent wall sections, hereinafter referred to, can be readily cleaned. Normally the platform E is retained in the position shown in Fig. 5 by a hook-like latch 67 which may be released when it is desired to rotate the platform about the periphery of the cab proper.

Figure 4:
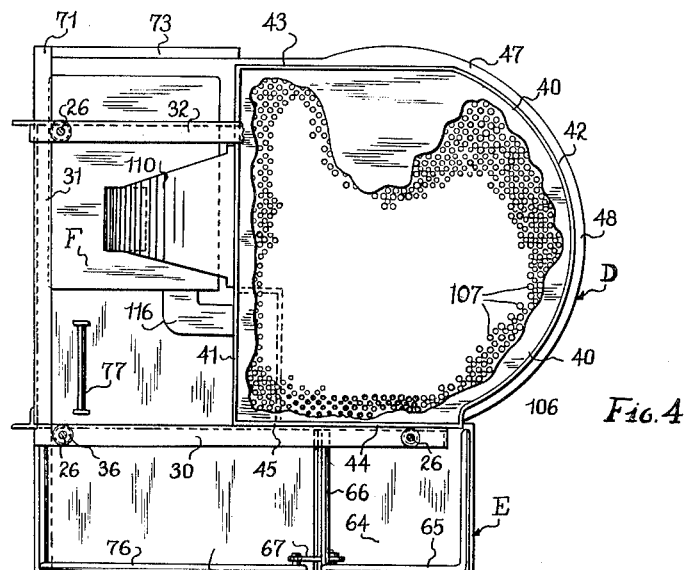
Fig. 4 is a sectional view, approximately on the line 4—4 of Fig. 3, with parts broken away to better show the construction.
Figure 2:
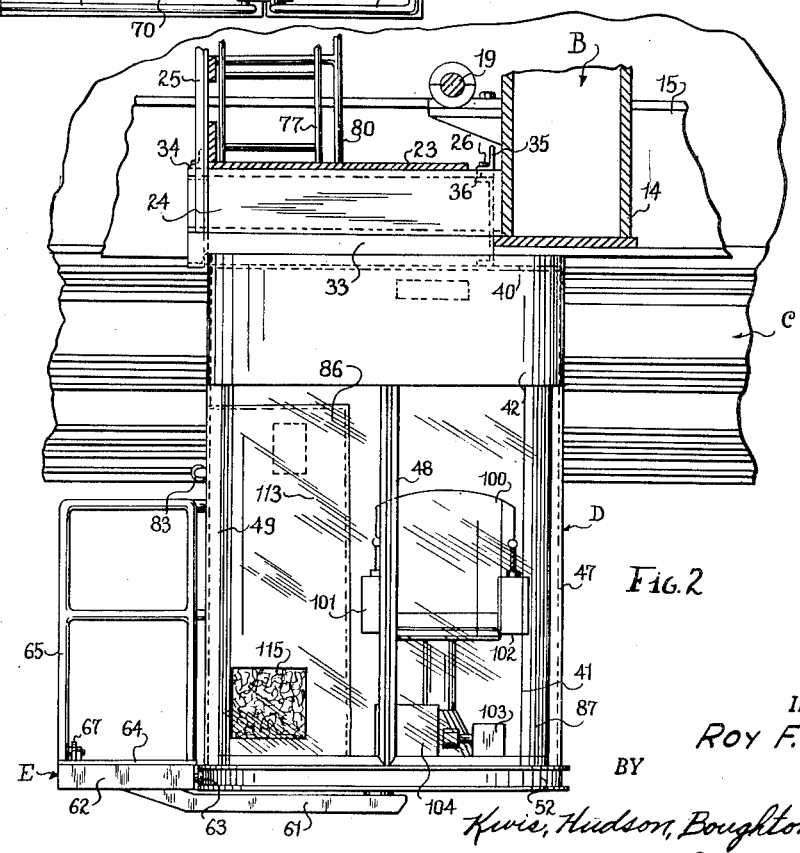
Fig. 2 is a fragmentary sectional view, approximately on the line 2—2 of Fig. 1.

The platform E, when in its normal position, aligns horizontally with a platform formed by a plate 70 welded to the top of the channel 55, previously referred to, and a channel member 71 parallel with the member 55 but spaced rearwardly thereof by a pair of channels 72, 73 welded to the ends thereof and to the ends of the channel 55. As shown, the plate 70 covers approximately one-half of the frame comprising the channel members 55, 71 to 73 and extends toward the platform E which, in its normal position, is spaced slightly forward of the member 55. The free edges of the plate 70 are preferably reinforced by braces 74, 75 welded underneath the same. In the embodiment shown, the front and left-hand sides of the platform formed by the plate 70, as viewed in Fig. 4 are provided with a guard rail 76 to prevent an operator from falling off. The side of the platform 70 nearest to the girder 14 is left open except for the refrigeration unit F; however, it is to be understood that the guard rail may be extended entirely around the platform, if desired.

Access to and from the platform formed by the plate 70 is provided by a ladder 77 resting upon the plate 70 and welded thereto and projecting upwardly through an opening 78 in the floor 23 of the walkway. The opening 78 is preferably surrounded by a guard 80 so as to eliminate all possibility of an operator accidentally falling therethrough. The guard 80 is provided with a movable section 81 for permitting access to and from the upper end of the ladder 77.

When the movable platform E is in its normal position, it aligns with a door 82 hinged to the edge of the vertical plate 45 opposite the edge welded to the back plate 41. The opposite side of the door 82 cooperates with the vertical member 49 and is provided with a latch 83 for retaining the same closed. The door comprises a steel frame 84 provided with a removable, transparent panel 85. The remaining walls of the cab are formed by two interchangeable, curved panels 86, 87 made of glass or other suitable transparent material and a similar plane panel 88 at the side adjacent to the crane bridge. The panel 86 is detachably secured to the vertical members 48, 49 by members 90, 91, respectively. The members 90 are secured to the member 48 by screws 92 and overlie the adjacent edges of the panels 86, 87. The members 91 are similarly secured to the member 49 but are shorter than the members 90 since they overlie merely the edge of the panel 86. The panels 87, 88 are detachably secured to the members 46, 47 in a similar manner. Members 93 similar to the member 91 are provided around the upper and lower edges of the panels 86, 87, 88. The edges of the transparent panel members are preferably surrounded by channel-shaped members 94 made of rubber, metal or the like. If made of metal, a rubber or like member 95 is preferably placed underneath the clamp members 90, 91 to better protect the edges of the transparent panels and prevent the leakage of air therearound.

The cab proper, which is preferably four to four and one-half feet in diameter, is provided with a stationary operator's seat 100, the center of which is slightly behind and to the bridge side of the center of the cab proper, as clearly shown in Fig. 5, and when seated, the operator has a substantially unobstructed view of the area over which the crane operates and other cranes which may be operating on the same runway. By leaning backward and turning his head slightly, the operator can see the crane hook even though it may be slightly behind him. As will be readily understood, any desired number of controls for the crane may be located in the cab proper. As shown, the controls include hand-operated, reversing controllers 101, 102 fixedly secured at opposite sides of the operator's seat for controlling the trolley travel and hoist motors, respectively. A foot-operated controller 103 controls the operation of the bridge travel motor. The hydraulic brake for the bridge is controlled by a master cylinder unit 104 including a foot treadle 105.

The ceiling for the cab proper is formed by a plate or partition 106 provided with a multiplicity of relatively small apertures 107, see Figs. 3 and 4. The plate or partition 106 is inclined with respect to the top plate 40 so as to provide a relatively large chamber 108 therebetween and the top plate 40, the rear part of which is relatively deep, for the connection of a fresh air conduit 110 connected to an air conditioning unit F located directly behind the operator's seat and to the rear of the plate 41. The air conditioning unit F may be of any commercial construction and is detachably supported by the members 55, 71. Alternatively the plate 70 may be extended to the channel member 73 and the air conditioning unit merely rested upon the plate and/or secured thereto in any desired manner. In addition to the fresh air duct 110 and the perforated plate 106 forming the ceiling of the cab proper, the air conditioning unit includes a return air duct 111 formed by two vertical plates 112, 113 extending from the floor of the cab to a point adjacent the ceiling and welded to the floor plate 51, the rear wall 41 and the side plate 45 and closed at its upper end by a plate 114. The lower end of the plate 113 is provided with an aperture within which a plurality of replaceable air filters 115 are secured. The upper end of the duct 111 is connected to the air conditioning unit F by a duct 116 of suitable construction.

Air is continuously circulated through the cab proper by the air conditioning unit F which may be of any commercial construction including a motor-driven fan. The air is filtered, humidified or dehumidified, as desired, heated or cooled, as desired, or otherwise conditioned so that the atmosphere within the cab may be maintained free of dirt, fumes, and the like and at a comfortable temperature.

Preferably the plate or partition 106 is provided with a multiplicity of uniformly spaced, small holes as with this construction a uniform flow of air through the cab can be obtained; in other words, the flow will not be concentrated at one part of the cab. A commercially available plate having uniformly spaced, 1/8" holes located on 1/4" staggered centers is being employed successfully in cabs which require cooling. Sufficient air can be circulated without producing a noticeable flow in the cab. The cool air appears to merely settle in the cab. The flow is so small and uniform that the operator is not conscious of it but nevertheless it is sufficient to cause him to feel cooler than the actual temperature of the air being circulated would indicate or suggest.

Figure 8:
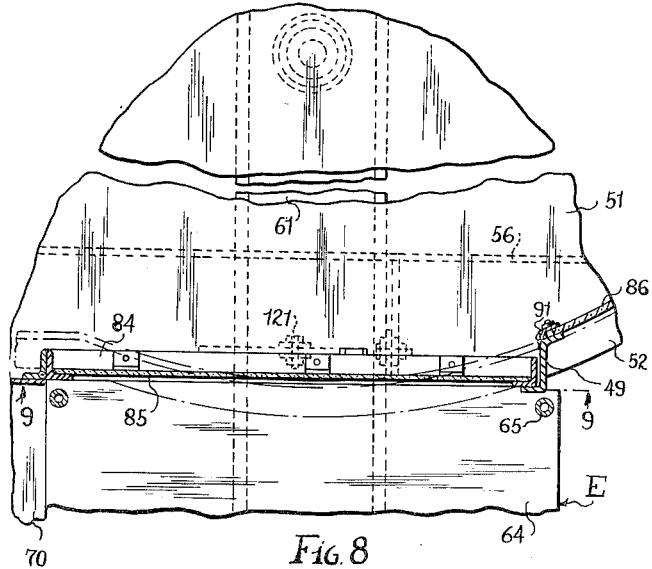
Fig. 8 is a fragmentary sectional view, approximately on the line 8—8, of Figs. 3 and 9.
Figure 9:
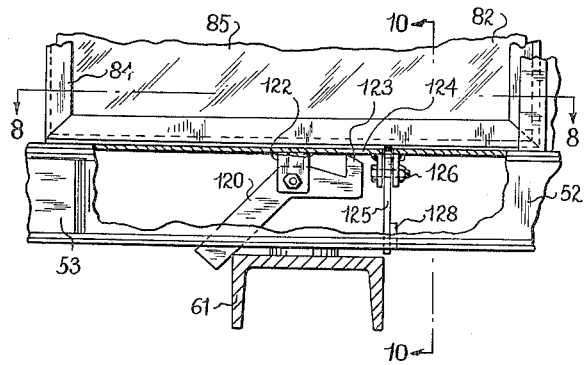
Fig. 9 is a fragmentary sectional view, approximately on the line 9—9, of Fig. 8.

The present invention also contemplates the provision of interlock means for preventing the opening of the door 82 unless movable platform E is in its normal position in front of the door and for preventing movement of the platform E away from its normal position in front of the door unless the door is closed. Referring particularly to Figs. 8 and 9, the door 82 is locked closed unless the platform E is in front of the door by a bell crank lever 120 pivotally supported underneath the floor plate 51 of the cab for rotation about a horizontal bolt 121 projecting through a suitable aperture in the lever and two downwardly extending members 122 welded to the underside of the floor plate 51. The pivot 121 for the bell crank lever 120 extends radially of the axis of rotation of the platform E and the left-hand arm thereof, as viewed in Fig. 9, projects downwardly into the path of the member 61 of the movable platform D. The other arm, that is, the right-hand arm, as viewed in Fig. 9, extends generally horizontally and has an upwardly projecting end 123 normally held below the floor 51 of the cab by engagement of the left-hand arm of the lever with the member 61, but adapted to move upwardly through a suitable slot 124 in the floor and into a position immediately inside of the lower frame member of the door 81 when the platform E is rotated in a counterclockwise direction, as viewed in Fig. 8. When the end 123 of the bell crank lever 120 projects upwardly behind the door it prevents the door from being opened. As the movable platform E returns to its normal position, the projection 123 of the bell crank lever is moved downwardly until the door clears the same by the engagement of the left-hand side of the member 61 with the left-hand arm of the bell crank lever. In the embodiment shown, the left-hand arm of the bell crank lever is longer and heavier than the right-hand arm thereof and the lever is continuously urged in a counterclockwise direction, that is, in a direction to move the extension 123 into the path of the door by gravity. As an alternative construction, spring means may be employed to move the lever into the path of the door.

Figure 10:
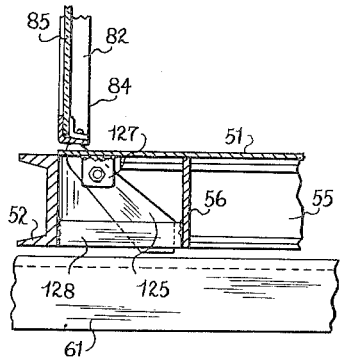
Fig. 10 is a fragmentary sectional view, approximately on the line 10—10, of Fig. 9.
Figure 11:
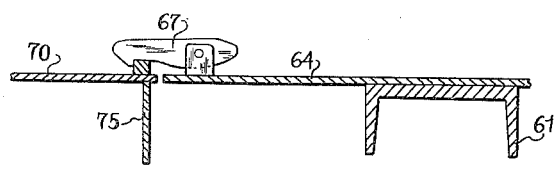
Fig. 11 is a fragmentary sectional view, approximately on the line 11—11, of Fig. 5.

The platform E is prevented from being moved out of its normal position in front of the door 82 when the door is open by a lever 125 pivotally supported underneath the floor 51 by a bolt 126 projecting through a suitable aperture therein and aligned apertures in members 127 welded to the underside of the floor plate 51. The bolt or pivot 126 extends generally radially of the axis of rotation of the door 82 and the upper end of the lever 125 projects upwardly through a suitable slot in the floor plate 51 where it is engaged by the door 82 as the door is closed to rotate the lever 125 in a counterclockwise direction, as viewed in Fig. 10. When the door 82 is opened, the lever rotates by gravity to a generally vertical position with the lower end thereof projecting in the path of the member 61 and preventing movement of the platform E away from the door proper. A member 128 located immediately to the right of the lever 125, as viewed in Fig. 9, and welded to the channel 52 and the floor brace 56 prevents the lever from being bent in the event an operator tries to force the movable platform E out of its normal position with the door open and the lever is in front of the member 61.

From the foregoing, it will be apparent that the objects of the invention heretofore enumerated and others have been accomplished and that there has been provided a novel and improved operator's cab of the character referred to having an air conditioning system which will not subject the operator to undue drafts, a plurality of interchangeable, transparent side wall panels readily replaceable from the inside of the cab, thus reducing the maintenance costs, and interlock means between the door of the cab and the movable platform thereof which will prevent an operator from accidentally slipping out of the cab while the movable platform is away from the door. While the preferred embodiment of the invention has been described in considerable detail, the invention is not limited to the particular construction shown and it is my intention to cover hereby all modifications and uses thereof which come within the practice of those skilled in the art to which the invention relates.

Having thus described my invention, I claim:

1. In an overhead operator's cab comprising a tubular-like member adapted to be supported with its longitudinal axis extending generally vertically and having its side walls formed largely of transparent material, a frame including a plurality of equally spaced side members extending lengthwise of the cab, transparent panels between said side members and having their marginal edges inside of and overlapping the marginal edges of said side members, and means located at the interior side of said side members and connected thereto and overlying marginal edges of said panels for detachably connecting said panels to said side members.

2. In an overhead operator's cab comprising a tubular-like member adapted to be supported with its longitudinal axis extending vertically and having its side walls composed largely of transparent material, a platform connected to and rotatable about the lower end of said tubular-like member, a door in a side wall of said tubular-like member providing access to and from said platform, lock means operatively connected to said tubular-like member and said door, means actuated by said platform for releasing said lock means when said platform is in front of said door, lock means operatively connected to said tubular-like member and said platform, and means actuated by said door for releasing said second lock means when said door is closed.

3. In an overhead operator's cab comprising a tubular-like member adapted to be supported with its longitudinal axis extending vertically and having its side walls composed largely of transparent material, a platform connected to and rotatable about the lower end of said tubular-like member, a door in a side wall of said tubular-like member providing access to and from said platform, lock means movably connected to said tubular-like member and normally projecting in the path of movement of said door and movable by said platform to a position clear of said door when said platform is in front of said door, and lock means movably connected to said tubular member and normally projecting in the path of movement of said platform and movable by said door to a position clear of said platform when said door is closed.

4. In an overhead operator's cab comprising a tubular-like member adapted to be supported with its longitudinal axis extending vertically and having its side walls composed largely of transparent material, a platform connected to and rotatable about the lower end of said tubular-like member, a door in a side wall of said tubular-like member providing access to and from said platform, and lock means movably connected to said tubular-like member and normally projecting in the path of movement of said door and movable by said platform to a position clear of said door when said platform is in front of said door.

5. In an overhead operator's cab comprising a tubular-like member adapted to be supported with its longitudinal axis extending vertically and having its side walls composed largely of transparent material, a platform connected to and rotatable about the lower end of said tubular-like member, a door in a side wall of said tubular-like member providing access to and from said platform, and lock means movably connected to said tubular-like member and normally projecting in the path of movement of said platform and movable by said door to a position clear of said platform when said door is closed.

ROY F. DEHN.

REFERENCES CITED

The following references are of record in the file of this patent:

UNITED STATES PATENTS

| Number | Name | Date |
|---|---|---|
| 1,491,424 | Robertson | Apr. 22, 1924 |
| 1,659,334 | Schumann | Feb. 14, 1928 |
| 1,877,582 | Pevear | Sept. 13, 1932 |
| 2,172,771 | Norris | Sept. 12, 1939 |
| 2,291,220 | Germonprez | July 28, 1942 |
| 2,310,414 | Fritzam et al. | Feb. 9, 1943 |
| 2,471,295 | Wehr | May 24, 1949 |